C. W. CROUSE.
WEED CUTTER FOR CULTIVATORS.
APPLICATION FILED SEPT. 17, 1909.
975,214.
Patented Nov. 8, 1910.
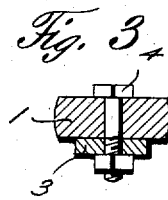
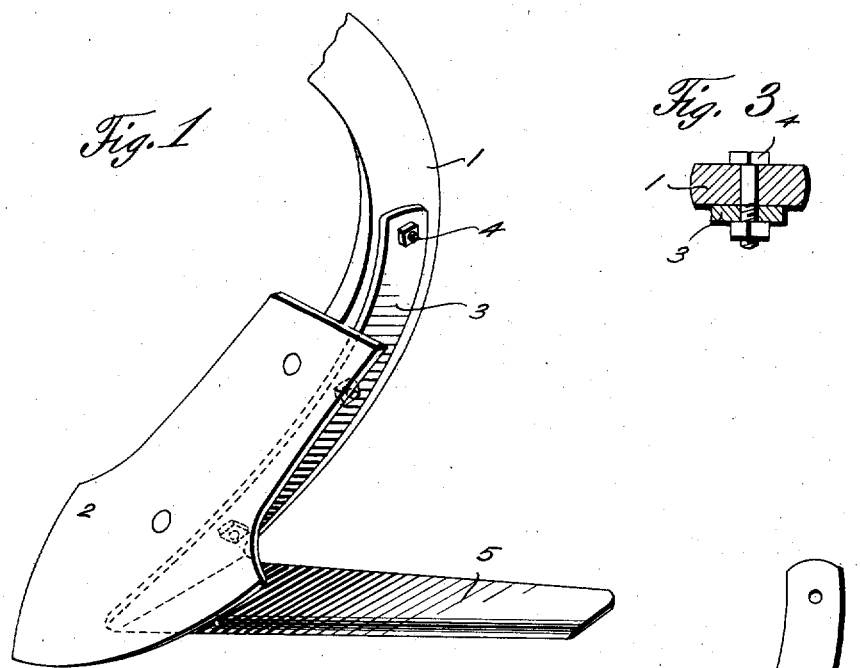
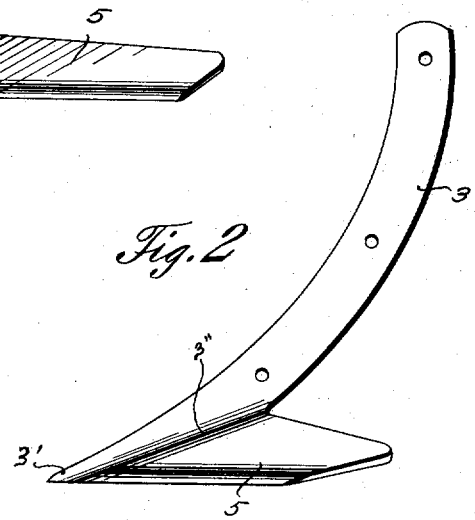

UNITED STATES PATENT OFFICE.

CHARLES W. CROUSE, OF THOMPSON, NEBRASKA.

WEED-CUTTER FOR CULTIVATORS.

975,214. Specification of Letters Patent. Patented Nov. 8, 1910.

Application filed September 17, 1909. Serial No. 518,237.

*To all whom it may concern:*

Be it known that I, CHARLES W. CROUSE, a citizen of the United States, residing at Thompson, in the county of Jefferson and State of Nebraska, have invented certain new and useful Improvements in Weed-Cutters for Cultivators, of which the following is a specification.

The object of this invention is to provide a peculiar form of weed cutting attachment for cultivators and in carrying out the invention a cutting attachment of peculiar form has been devised, the same being arranged in a peculiar manner with reference to the shovel of a cultivator to obtain the most efficient results in severing roots of weeds as the cutting blade of the attachment operates beneath the surface of the ground.

For a full understanding of the invention reference is to be had to the following detail description and to the accompanying drawings, in which—

Figure 1 is a perspective view showing the downwardly curving standard of a cultivator, partly broken away, and illustrating the invention in operative position thereon and adjacent to the shovel secured thereto. Fig. 2 is a side elevation of the weed cutting attachment alone, and Fig. 3 is a transverse section through the standard and the attaching shank of the cutting device and about on the line 3—3 of Fig. 1.

Similar reference characters refer to similar parts throughout the description and drawings.

Specifically describing the invention and the manner of its use, and referring particularly to the drawings, the numeral 1 denotes a standard, or rather the rear portion of a standard of an ordinary cultivator, said standard having to its lower portion in the customary manner a suitable shovel.

The weed cutting attachment comprising this invention is arranged at one side of the standard 1 and has an upwardly extending shank 3 curved to conform with the curvature of the standard 1 and secured to the standard in rear of the shovel 2 by means of suitable bolts or fastenings 4. The shank 3 of the cutting device lies flat against the adjacent side of the standard 1 and projecting laterally from the lower end of the shank 3 is a cutting blade 5 which tapers toward its outer end as well as inclining rearwardly and upwardly in transverse section. The cutting edge of the blade 5 inclines rearwardly also and this is advantageous in that as the blade operates beneath the surface of the ground it will have a sort of shearing cutting action in cutting the weeds at the roots; also, the arrangement of the blade 5 as just set forth eliminates likelihood that weeds or similar obstructions will become clogged and retard the progress of the device or its efficiency. The blade 5 is preferably integral with the shank 3 by which it is attached to the standard 1. It will be observed that the shank 3 tapers toward its lower end substantially to a point 3' and is formed with a lower edge portion 3'' adjacent to the point 3'. The said edge portion 3'' is arranged substantially in line with the direction of advancing movement of the shovel 2 and the blade 5 extends from the edge 3'' in the manner hereinbefore described. The angular portion of the attachment comprised by the formation of the blade 5 integrally with the lower edge portion 3'' of the shank 3, is arranged below the penetrating portion of the shovel 2 and it will be apparent that said angular portion being located substantially in line with the advancing movement of the shovel 2 is calculated to afford a maximum amount of substantiality or rigidity. Furthermore, the lower end portion of the shank 3 being arranged in rear of the shovel 2, relieves the angular portion of the attachment at the edge 3'' of considerable strain and reinforces said portion against the strain incidental to the operation of the blade 5 in the ground and the engagement of said blade with heavy roots or obstacles such as small stones, etc.

My improved cutting device is especially advantageous since it loosens the soil, thereby making a dust mulch which is highly desirable.

Having thus described the invention, what is claimed as new, is:—

The combination with a cultivator comprising a standard and a shovel secured to the lower end of said standard, of a weed cutting attachment comprising a shank bolted to the lower portion of the standard and extending downwardly in rear of the shovel and terminating in the point 3' located below the earth penetrating portion of the shovel, the shank being formed at its lower end with the edge portion 3' substantially in line with the direction of advancing movement of the shovel in the ground, an angular blade being formed with the shank As will be seen therefore, Be it known that I, CHARLES W. CROUSE, a citizen of the United States, residing at Thurman, in the county of Jefferson and State of Nebraska, have invented certain new and useful Improvements in Weed Cutting Attachments, of which the following is a specification.

The object of this invention is to provide in a positive form of weed cutting attachment for cultivators and in carrying out the invention a cutting attachment of peculiar form has been devised, the same being arranged in a positive manner with reference to the shovel of a cultivator to obtain the most efficient results in severing roots of weeds as the cutting blade of the attachment operates beneath the surface of the ground.

For a full understanding of the invention reference is to be had to the following detail description and to the accompanying drawings, in which:—

Figure 1 is a perspective view showing the downwardly curving standard of a cultivator, partly broken away, and illustrating the invention in operative position thereon and adjacent to the shovel referred thereto. Fig. 2 is a side elevation of the weed cutting attachment alone, and Fig. 3 is a transverse section through the standard and the attaching shank of the cutting device and about on the line 2—3 of Fig. 1.

Similar reference characters refer to similar parts throughout the description and drawings.

Specifically describing the invention and the manner of its use, and referring particularly to the drawings, the numeral 1 denotes a standard, or rather the rear portion of a standard of an ordinary cultivator, said standard having to its lower portion in the customary manner a suitable shovel.

The weed cutting attachment comprising this invention is arranged at one side of the standard 1 and has an upwardly extending shank 3 curved to conform with the curvature of the standard 1 and secured to the standard in rear of the shovel 2 by means of suitable bolts or fastenings 4. The shank 3 of the cutting device lies flat against the adjacent side of the standard 1 and projecting laterally from the lower end of the shank 3 is a cutting blade 5 which tapers toward its outer end as well as inclining rearwardly and upwardly in transverse section. The cutting edge of the blade 5 inclines rearwardly also and this is advantageous in that as the blade operates beneath the surface of the ground it will have a sort of sawing action in cutting the weeds, as the case may be, when the cross edges of the blade are put forth eliminating clogging or similar obstruction to the ready operation of the blade, clogged and ruined the progress of the blade, as its efficiency. The blade 5 is preferably integral with the shank 3 attached to the standard 1, it will be observed that the shank 3 tapers toward its lower end substantially to a point 3' and is formed with a lower edge portion 3'' adjacent to the point 3'. The said edge portion 3'' is arranged substantially in line with the direction of advancing movement of the shovel 2 and the blade 5 extends from the edge 3'' in the manner hereinbefore described. The angular portion of the attachment comprised by the formation of the blade 5 integrally with the lower edge portion 3'' of the shank 3 is arranged below the penetrating portion of the shovel 2 and it will be apparent that said angular portion being located substantially in line with the advancing movement of the shovel 2 is calculated to afford a maximum amount of substantiality or rigidity. Furthermore, the lower end portion of the shank 3 being arranged in rear of the shovel 2 relieves the angular portion of the attachment at the edge 3'' of considerable strain and reinforces said portion against the strain incidental to the operation of the blade 5 in the ground and the engagement of said blade with heavy roots or obstacles such as small stones, etc.

My improved cutting device is especially advantageous since it loosens the soil thereby making a dust mulch which is highly desirable.

Having thus described the invention, what is claimed as new, is:—

The combination with a cultivator comprising a standard and a shovel secured to the lower end of said standard, of a weed cutting attachment comprising a shank bolted to the lower portion of the standard and extending downwardly in rear of the shovel and terminating in the point 3', located below the earth penetrating portion of the shovel, the shank being formed at its lower end with the edge portion 3'', substantially in line with the direction of advancing movement of the shovel in the ground, an angular blade being formed with the shank and extending angularly therefrom at the edge portion 3'' and inclined slightly upward toward its rear portion, the angular portion of the attachment formed by the blade adjoining the lower end of the shank being arranged in rear of the earth penetrating portion of the shovel and also substantially in line with the direction of strain incidental to the operation of the cutting blade beneath the surface of the ground.

In testimony whereof I affix my signature in presence of two witnesses.

CHARLES W. CROUSE.

Witnesses:
ERMA KAUTZMAN,
O. H. BONNEY.